United States Patent

[11] 3,566,092

| [72] | Inventors | Michael P. Grant;<br>Henry T. Jaggers, Columbus, Ohio |
|---|---|---|
| [21] | Appl. No. | 545,499 |
| [22] | Filed | Apr. 26, 1966 |
| [45] | Patented | Feb. 23, 1971 |
| [73] | Assignee | Industrial Nucleonics Corporation |

[54] AVERAGING COMPUTER
17 Claims, 13 Drawing Figs.

[52] U.S. Cl. .................................................. 235/151.3,
235/151.35, 235/194, 235/196
[51] Int. Cl. ...................................................... G06g 7/12
[50] Field of Search.......................................... 235/151.1,
151.3, 150.5, 150.52; 235/194, 195, 196; 330/9

[56] References Cited
UNITED STATES PATENTS

| 3,004,707 | 10/1961 | Wilson | 235/183 |
| 3,015,129 | 1/1962 | Hays et al. | 235/151.1X |
| 3,294,961 | 12/1966 | Hose | 235/194X |

OTHER REFERENCES
Granino A. and Theresa M. Korn, Electronic Analog Computers, (1) page 339 FIG. a (2) page 269 FIG. C

*Primary Examiner*—Malcolm A. Morrison
*Assistant Examiner*—Edward J. Wise
*Attorneys*—Cushman, Darby and Cushman, William T. Fryer, III, C. Henry Peterson and James J. O'Reilly ABSTRACT: Specifically disclosed is an averaging system for obtaining the average value of a signal representing a transduced parameter such as the thickness of a sheet of material which is scanned by a gauge. The signal is integrated and the integral is divided by a signal representing the elapsed averaging time. The division is performed by a divider including an operational amplifier integrator having two summing circuit inputs, with the integral signal applied to one input and the amplifier output fed back to the other input through a resistive voltage divider. The feedback signal input to the summer is alternately applied and reduced to zero in response to a time-modulation signal comprising constant-duration pulses which are time-spaced in dependence on the signal representing the elapsed averaging time.

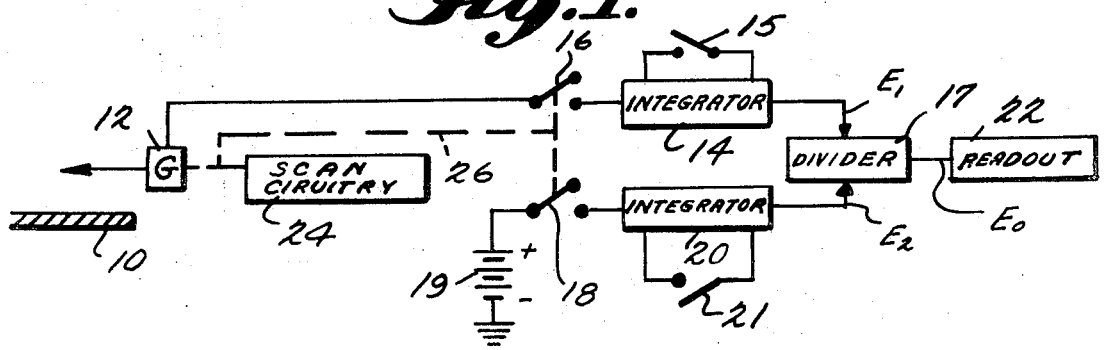
Fig. 1.
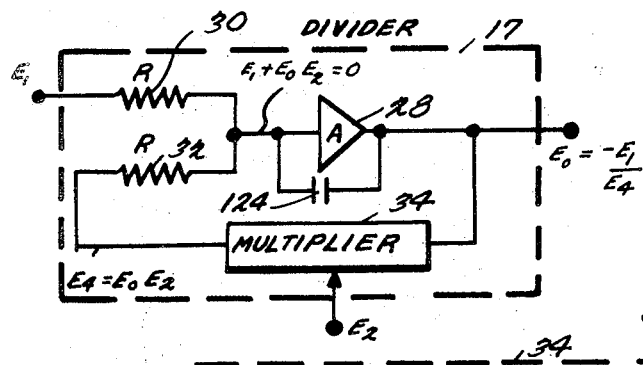
Fig. 2.
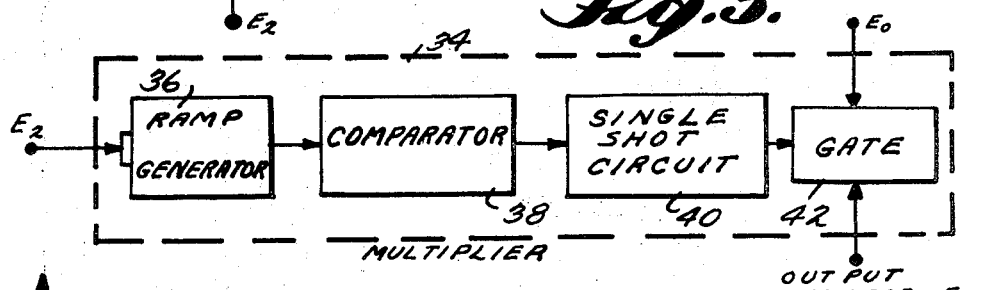
Fig. 3.
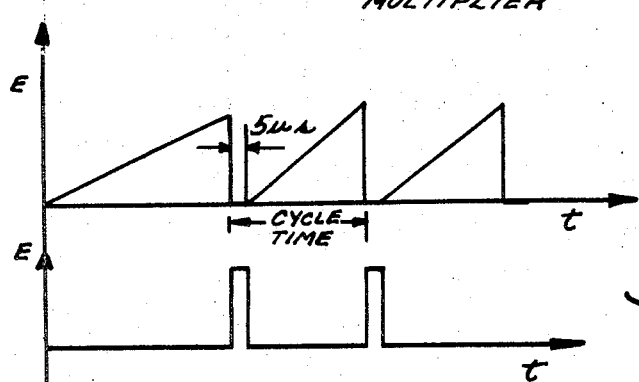
Fig. 9.
Fig. 10.
Fig. 11.
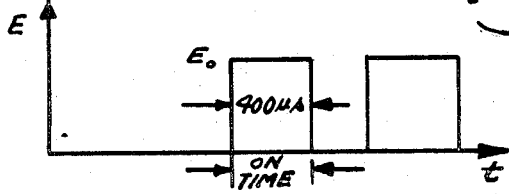
Fig. 12.
INVENTORS
MICHAEL P. GRANT
BY HENRY T. JAGGERS
Cushman, Darby & Cushman
ATTORNEYS

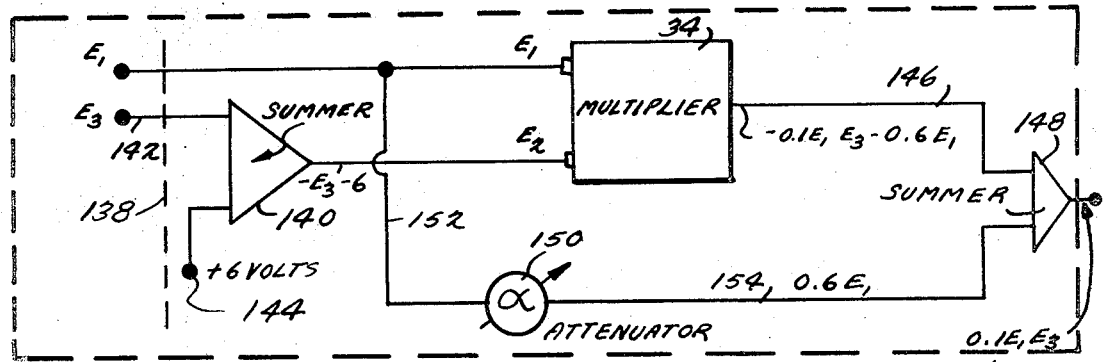
Fig. 5.
Fig. 6.
Fig. 7.
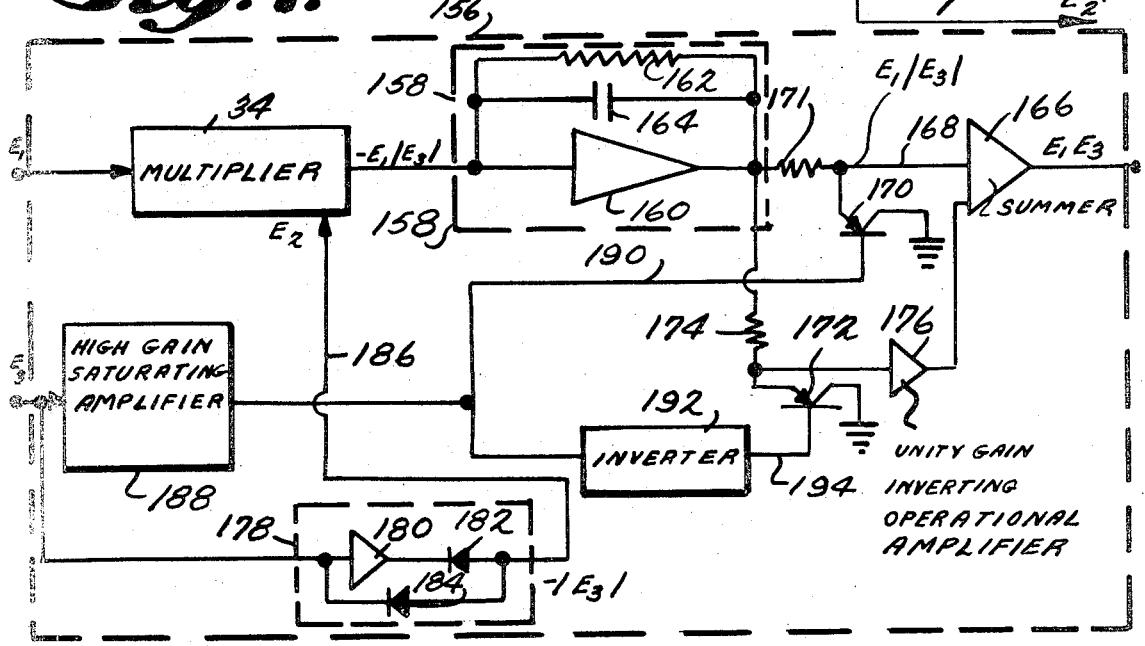
Fig. 8.
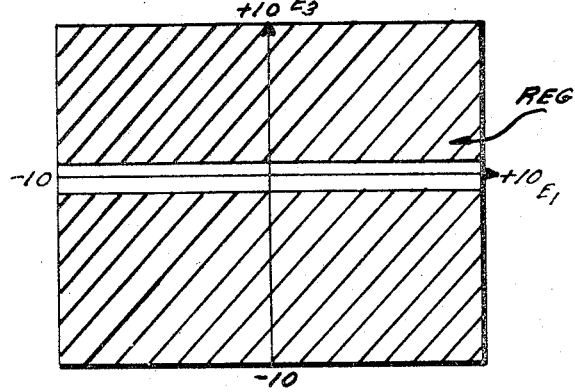
INVENTORS
MICHAEL P. GRANT
HENRY T. JAGGERS
BY
Cushman, Darby & Cushman
ATTORNEYS

AVERAGING COMPUTER

This invention relates to improved apparatus for obtaining a time independent average value of a parameter such as the thickness profile of a sheet of material along the width thereof. Also, this invention relates to an improved apparatus for multiplying two slowly varying analogue signals.

Further, this invention relates in particular to an improved apparatus for obtaining a running or current average value of a parameter such as the thickness of a sheet of material wherein the sheet of material is scanned to obtain an instantaneous value of the parameter, the integral of this parameter with respect to time being calculated and the integral being divided by the elapsed time to obtain the desired running average value.

This invention employs an analogue divider to achieve the before-mentioned addition. In particular, a divider is employed which utilizes a time division multiplier in the feedback path of an operational amplifier.

Thus, this invention relates to a multiplier of analogue signals wherein the output therefrom is a train or sequence of rectangular voltage pulses, the duty cycle being a function of one of the analogue signals and the amplitude being a function of the other, the duty cycle being regulated by improved means for maintaining the accuracy thereof.

Accordingly, it is an object of this invention to provide an improved apparatus for obtaining the running average value of a parameter such as the thickness of a sheet of material.

It is a further object of this invention to provide an improved multiplier circuit of analogue signals where the output therefrom is a time-modulated signal and improved means are included for regulating the duty cycle of the signal.

It is a further object of this invention to provide an improved divider circuit employing a time division multiplier circuit in the feedback path of an operational amplifier, the time modulating wave forms being supplied from an asynchronous source.

Other objects and advantages of this invention will become apparent upon reading the appended claims in conjunction with the following detailed description and the attached drawings, in which:

FIG. 1 is a block diagram showing the overall relation of the various components of the system which measures the average value of the desired parameter (such as thickness of a sheet of material);

FIG. 2 is a block diagram showing the divider circuit shown in FIG. 1;

FIG. 3 is a block diagram of the multiplier circuit shown in FIG. 2;

FIG. 5 is a block diagram of a modification to the multiplier shown in FIG. 3 which enables it to operate as a four quadrant or pole multiplier;

FIG. 6 is a graph illustrating the four quadrant operation of the modified multiplier shown in FIG. 5;

FIG. 7 is an alternate modification of the multiplier circuit shown in FIG. 3 for providing for four quadrant operation;

FIG. 8 is a graph illustrating for four quadrant operation of the circuit shown in FIG. 7;

FIG. 9 is a graph of the wave form of the output voltage from the ramp generator of the multiplier shown in FIG. 3;

FIG. 10 is a graph of the wave form of the voltage pulses appearing at the output of the comparator of the multiplier as shown in FIG. 3;

FIG. 11 is a graph of the wave form of the output voltage from the single shot circuit of the multiplier shown in FIG. 3;

FIG. 12 is a graph of the wave form of the output voltage from the multiplier as shown in FIG. 3; and FIG. 13 is a graph illustrating a compensation feature of the invention for insuring accurate division by the divider shown in FIG. 2.

Figure 4:
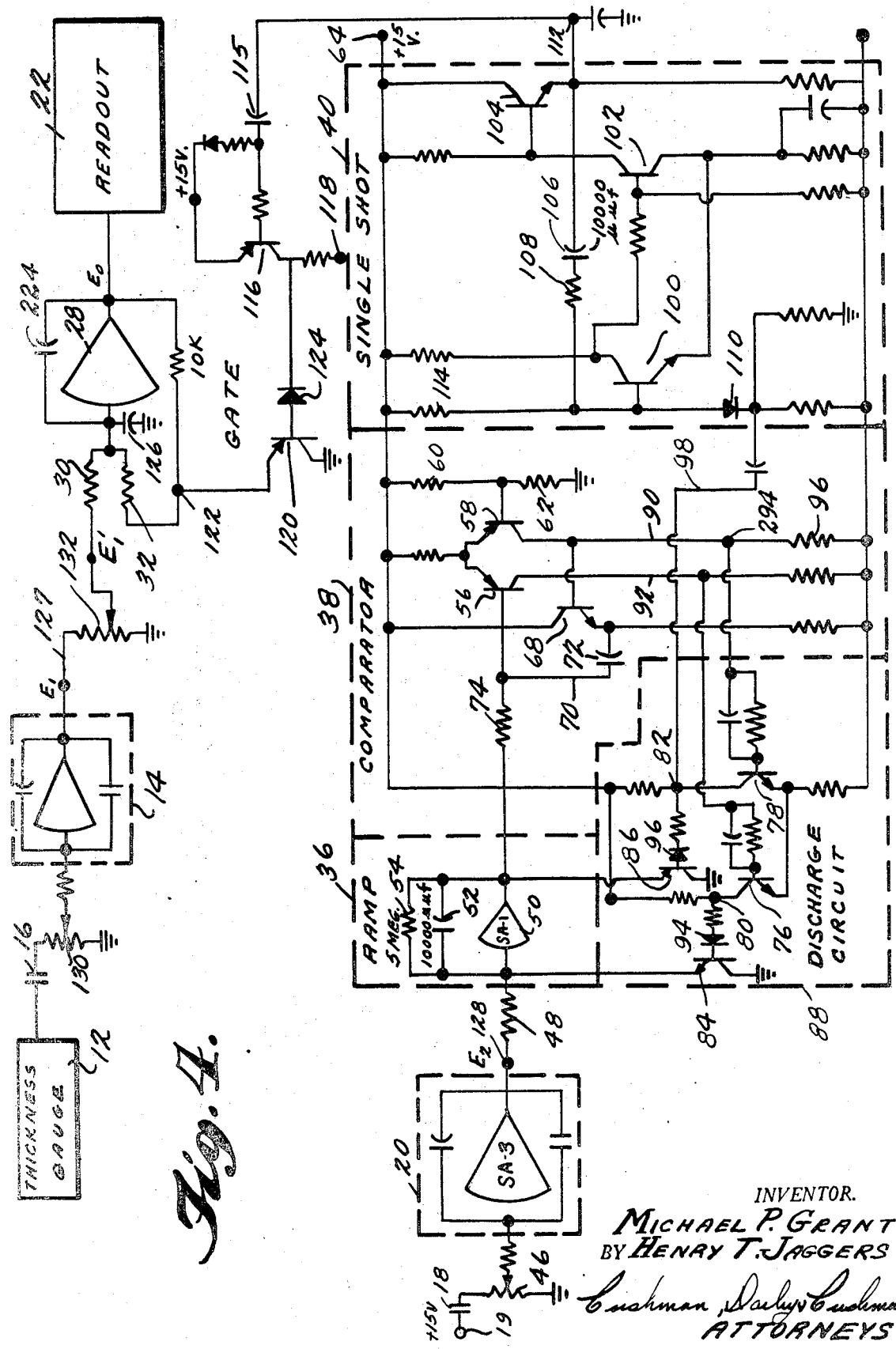
FIG. 4 is a schematic diagram of the overall system shown in FIG. 1.

Referring now to FIG. 1, there is shown a block diagram of the overall system of this invention. A material 10, the running average value of the thickness of which is to be measured, is scanned by a gauge 12 which travels across the width thereof. The gauge 12 typically is a radiation gauge where a source (not shown) either transmits various types of nucleonic radiation through or reflects the radiation from the material 10 as the gauge 12 moves. The gauge also includes a detector (not shown) which is responsive to the transmitted or reflected radiations and generates an electrical signal corresponding to the instantaneous value of the thickness of the material adjacent to the current position of the gauge 12 with respect to the material 10. Broadly, the gauge 12, together with the material 10, may be termed a thickness transducer. Of course, other parameters of the material which effect the amount of radiation transmitting through or reflecting therefrom may also be measured. For instance, these parameters may be atomic number, density, etc.

The gauge 12 may comprise other transducers such as a magnetic caliper gauge or a radio frequency moisture gauge.

Further, although it is not shown, a reference signal corresponding to a preferred, predetermined thickness of the material may be subtracted from the gauge signal to obtain an instantaneous value of the deviation of the gauge signal from the reference signal. Thus, the running average in this instance would be of the deviation signal.

The output signal from the gauge is applied to an integrator circuit 14 through switch 16. The amplitude of the output of integrator 14 corresponds to the integral of the instantaneous value of the particular parameter being measured with respect to time. This signal is applied to divider 17.

A source 19 of DC voltage is applied to integrator 20 through switch 18. The amplitude of the output signal from integrator 20 corresponds to the time elapsed from the beginning of the scan to the current position of the gauge 12 with respect to the material 10. This signal is also applied to divider 17.

The output signal from integrator 14 corresponds to the dividend, the output signal from integrator 20 corresponds to the divisor and the output signal from divider 17 corresponds to the quotient of these two signals, that is, the time independent, average value of the parameter being measured. The output signal is applied to an appropriate readout indication device 22.

The switches 16 and 18 are controlled by scan circuitry 24 which is responsive to the initiation of each scan of the material 10 by the gauge 12. Each time a scan is completed, switches 16 and 18 are opened via appropriate mechanical linkage 26. All voltages are maintained for purposes of readout. After sufficient time has elapsed to readout these signals, the integrators 14 and 20 are reset by closing switches 15 and 21. As soon as each scan commences, the switches 16 and 18 are reclosed, switches 15 and 21 are reopened, and the determination of the average value is recalculated. This is necessary, since the material 10 is continuously moving inwardly to or outwardly from the plane of the FIG. 1.

Referring now to FIG. 2, there is shown a block diagram of the divider circuit described with respect to FIG. 1, this divider having the same reference numeral as shown in FIG. 1. For a measuring system which determines the average value of a slowly varying quantity, such as the thickness of the material 10, as shown in FIG. 1, the divider 17 must have special characteristics. That is, where it is necessary to divide one slowly varying voltage by another such as $E_1$ and $E_2$ in FIG. 2 the division process may be subject to the typical following constraints:

$$E_0 = -10\frac{E_1}{E_2} \text{ volts for } -\frac{10}{0 \leq E_2} \text{ volts} \leq E_1 + 10 \text{ volts}$$

with the following errors:
1. for $E_1 = 0$, $$E_0 = \frac{0}{E_2} \pm 0.025 \text{ volts}$$

2. for 2.5 volts $\leq E_2 \leq 10$ volts, and $E_1 \neq 0$, an additive error of 3 percent of reading is allowed, i.e., $$E_0 = 10\frac{E_1}{E_2} \pm 0.025 \text{ volts} \pm 0.3 \frac{E_1}{E_2}$$

These error tolerances are not easily met by the electronic dividers of prior art devices. However, because of the improved characteristics of the time division multiplier 34 in the feedback path of the operational amplifier 28 of FIG. 2, these tolerances can be met.

Referring to FIG. 2, the operational amplifier 28 has connected to its input terminal two input resistors 30 and 32. The resistor 30 is connected to the input of integrator 14 and therefore receives the integrated instantaneous value of the thickness with respect to time. The resistor 32 receives the output voltage from amplifier 28 after it has been multiplied at multiplier 34 by the output voltage from integrator 20 of FIG. 1. Such a divider circuit has already been generally described in the text Electronic Analogue Computers, Korn & Korn, p. 339, McGraw-Hill Publishing Company. As shown in FIG. 2, the output voltage from the divider circuit must necessarily equal the quotient of the division of $E_1$ by $E_2$ because the input to the amplifier 28 is maintained at effective ground. That is, since $E_1 + E_0 E_2 = 0$, it follows that $E_0 = -E_1/E_2$.

Reference should now be made to FIG. 3 where a block diagram of the improved multiplier is shown, this multiplier having the same reference numeral as that employed in FIG. 2. As pointed out with respect to FIG. 2, the multiplier 34 respectively receives the output voltage $E_0$ from the amplifier 28 and the voltage $E_2$ from the integrator 20 in FIG. 1. This multiplier 34, as shown above, is restricted by the constraints which correspond to those imposed upon the divider circuit mentioned above. Thus, the voltage $E_0$ may typically vary between $\pm 10$ volts, while the voltage $E_2$ must always have negative polarity. There will be described hereinafter with respect to FIGS. 5 through 8 circuitry for modifying the multiplier shown in FIG. 3, so that these constraints are no longer applicable.

The output voltage from integrator 20 corresponds to the voltage $E_2$ and the output voltage from the operational amplifier 28 corresponds to the voltage $E_0$. Voltage $E_2$ is integrated at ramp generator 36 to form a ramp signal at the output thereof as shown in FIG. 9. The time required for the ramp voltage to reach the threshold setting of a comparator 38 is an inverse function of the amplitude of the input voltage to the ramp generator. Hence, this ramp rise time is a function of the time elapsed from the beginning of the gauge 12 scan. At the time the ramp voltage equals the comparator voltage, the comparator is actuated and applies an output pulse, the wave form of which is illustrated in FIG. 10, to a monostable multivibrator or single shot circuit 40. The wave form of the voltage output of circuit 40 is illustrated in FIG. 11. This output signal is applied to gating circuit 42 and acts as the gating signal therefor. The length of the output wave form generated from gate 42 depends on the length of the gating wave form and the amplitude of the gating circuit output voltage is equal to the amplitude of the operational amplifier output signal $E_0$.

Having now briefly described the functions of the components of FIG. 3, the operation of the overall system will now be described in relation to a specific example for computing a running average of a desired parameter, referring to FIGS. 1-–3. The integrated value of the instantaneous value $E_1$ of the desired parameter with respect to time is shown at the input of divider 17. $E_2$ corresponds to the signal representative of the time elapsed from the beginning of the scan, as stated before. The output signal from ramp generator 36 has a typical cycle time or period of $$T_p = \frac{5,000}{E_2}$$

microseconds. The comparator 38 in FIG. 3 has a typical threshold voltage of 8 volts. Thus, the above equation establishes the time for the ramp to go from zero to 8 volts, at which time the comparator is triggered.

The comparator output pulse triggers the single shot circuit 40 and an output gating signal is applied therefrom to gate 42. This signal switches the gate on, thereby gating the output voltage from operational amplifier 28 back to its input. The duration of the gating wave form applied to gate 42 may be 400 microseconds as shown in FIG. 11. Thus, the output signal from the gate 42 also has a 400 microseconds duration as shown in FIG. 12.

The average value of the wave form shown in FIG. 12 is the product of the amplitude of the output voltage $E_0$ from the operational amplifier 28 and the duty cycle, D, of the output wave form from gate 42 where D equals $$D = \frac{\text{On Time}}{\text{Cycle Time}} = \frac{400\mu_s}{\frac{5,000\mu_s}{E_2}} = .08 E_2$$

Thus, the average value of $E_4$ is $$\overline{E}_4 = E_0 D = .08 E_2 E_0$$

Amplifier 28 includes a feedback capacitor 124 and is thus a low pass, high gain, summer. Hence, the time modulated output signal from gate 42 is averaged by capacitor 124. This capacitor also serves the further function of grounding the input to amplifier 28. Since no current flows into amplifier 28, its input voltages $E'_1$ and $E_4$ must be equal and opposite. $E'_1 = 0.8 E_{1aq}$, this being accomplished by potentiometer means that will be described in more detail hereinafter with respect to FIG. 4 for reasons that will become apparent from the following equation $$E'_1 = -E_0 D = -.08 E E_0 = 0.8 E_1 \quad \text{from which}$$

$$E_0 = \frac{-10 E_1}{E_2}$$

This corresponds to the requirement established for the divider circuit hereinbefore described.

Having now described the division operation of the invention, the circuitry for obtaining an accurate, precise duty cycle is now described with reference to FIG. 4. From the foregoing it is apparent that the duty cycle must be accurately maintained.

The structure and operation of the circuitry shown in FIG. 4 will now be described. The same reference numerals are used in all FIGS. to identify functionally equivalent elements. Typical operating voltages and component values are shown in the drawing and employed in the following description: however, these values should not be interpreted as limitations of this invention. Source 19 is typically a 15 volt source which is connected to potentiometer 46 through the contacts of relay or switch 18. The voltage developed at the wiper of the potentiometer 46 is integrated at integrator 20, the construction of the element being well known.

The output signal from integrator 20 is a negative going ramp signal and is applied to ramp circuit 36 which comprises an input resistance 48, operational amplifier 50 and condenser 52. The output ramp from integrator 20 is a slowly varying signal with respect to the ramp generated by circuit 36, which has a range of cycle times from 500 to 2000 microseconds, the cycle time depending on the generator 36 input voltage, as stated before. Resistor 54 is employed with the basic timing elements of resistor 48 and condenser 52 to modify the timing control of these elements in order to more precisely control the duty cycle as will be described in more detail hereinafter. The output from the ramp generator 36 is fed to comparator 38, which comprises a pair of emitter-coupled transistors 56 and 58. Transistor 56 is normally on while transistor 58 is normally off, its emitter-base junction being back-biased by an 8 volt DC signal developed across resistors 60 and 62 from the 15 volt supply 64. A positive going output pulse, as shown in FIG. 10, is developed at the collector of transistor 58 when the voltage on the base of transistor 56 equals 8 volts, the output pulse being applied to emitter follower transistor 68 and then to a delay network 70 comprising capacitor 72 and resistor 74.

The purpose of delay network 70 is to maintain the transistor 56 in its off condition for a period of typically 5 microseconds so that the output voltage pulse from the comparator appearing at the collector of transistor 58 will be on for this 5 microsecond period.

When the positive going pulse occurs at the collector of transistor 58, a negative going pulse occurs at the collector of transistor 56. These pulses appearing at the collectors of transistors 56 and 58 are respectively applied to the transistor amplifiers 76 and 78. The transistors 76 and 78 are normally respectively on and off, that is, during the time when voltage is increasing at the base of transistor 58, but before the comparator voltage of 8 volts is attained. Thus time is also referred to as the ramp time. Thus, there are applied to the terminals 80 and 82 voltages which respectively tend to keep the emitter-base junctions of switching transistors 84 and 86 reversed biased during the ramp time of ramp circuit 36.

Switching transistors 84 and 86 together with the amplifier transistors 76 and 78 basically comprise a discharge circuit 88, the purpose of which is to discharge capacitor 52 after it has attained the threshold voltage of the comparator. Capacitor 52 is discharged for a period of time required to substantially eliminate any potential appearing across its terminals. In a typical example, this may require about 5 microseconds. Thus, the output voltage pulses on lines 90 and 92 are maintained for 5 microseconds by delay circuit 70. Also included in switching circuit 88 is a pair of diodes 94 and 96 respectively connected to the bases of transistors 84 and 86, which are respectively NPN and PNP transistors which are either both on or both off. The purpose of the diodes 94 and 96 is to prevent the switching transistors 84 and 86 from being too negatively biased during the ramp time of generator 36, thereby preventing Zener breakdown of the transistors 84 and 86, thereby loading the timing circuit of the ramp generator 36. Thus, the transistors 84 and 86 do not effect the ramp wave form at the output of generator 36 during the ramp time.

To discharge the capacitor 52, it is necessary to switch transistors 84 and 86 on, thereby providing the necessary rapid discharge path. Transistors 84 and 86 are switched by the voltage pulses occurring respectively on lines 92 and 90, these pulses being respectively transferred through transistor amplifiers 76 and 78. As stated before, at least 5 microseconds are typically required for complete discharge of capacitor 52. The transistors 84 and 86 will be on as long as transistor 56 remains off. However, there is a tendency for the voltage at the base of transistor 56 to drop to zero because of the discharge of capacitor 52. This is compensated for by the delay circuit 70 which maintains the base of transistor 56 at a sufficiently high voltage for the required 5 microsecond interval. Thus, transistor 56 will not prematurely cut off.

The transistors 84 and 86 are operated in the inverted mode — that is, grounded collectors and both the emitter-base and collector-base junctions of these transistors are forward biased during the discharge of condenser 52. Thus, a low offset voltage (that is, the voltage between the collector and emitter of these transistors) is developed, this being well known in the transistor art. Typically, the offset voltage during the inverted mode of operation is 1—2 millivolts. As shown in FIG. 9, the ramp voltage is returned to zero. The closer this voltage is returned to zero after discharge, the more precise the duty cycle and therefore the greater the overall accuracy of the system. This follows since the duty cycle is a function of the cycle time and since the cycle time is determined by rise time from zero to 8 volts, as described hereinbefore. Thus, the connection of the inverted transistor switches 84 and 86 to the capacitor 52, as shown in FIG. 4, is very important in insuring that the ramp voltage is returned to zero volts. Since a mere 1- —2 millivolts occur across transistors 84 and 86 during the inverted mode operation thereof, the desired end is effectively achieved.

As stated before, when the voltage on the base of transistor 56 equals the 8 volts on the base of transistor 58, a positive going pulse is developed on line 90 at terminal 294 across resistor 96, since transistor 58 is turned on. This positive going pulse causes terminal 82 to develop a negative going pulse which is applied over line 98 to the input of the single shot circuit 40. This negative going pulse is an asynchronous signal which is not developed from a source of clock pulses as has been done in prior art time division multipliers. Thus, there is no potential source of inaccuracy in this invention because of unstable source of clock pulses.

The single shot circuit 40 is a conventional circuit comprising normally on transistor 100 and normally off transistor 102. An emitter follower transistor 104 is connected to the feedback path from the collector of 102 through timing condenser 106 and resistor 108 to the base transistor 100. Thus, the application of the negative going pulse from terminal 82 to the base of transistor 100 through diode 110 cuts the transistor 100 off, thus turning transistor 102 on. Because of the regenerative feedback through the condenser 106, the single shot circuit is rapidly switched from one state to the other, as is well known. The output voltage is developed at terminal 112 as shown in FIG. 11. As can be seen from FIG. 11, the wave form at terminal 112 is reduced to −7 volts for a period of 400 microseconds, this 400 microseconds interval being determined by the amount of time necessary for condenser 106 to recharge through resistors 108 and 114 until a positive voltage is developed at the base of transistor 100 sufficient to switch it back on. The output voltage from terminal 112 is coupled through capacitor 115 to the base of transistor amplifier 116. This amplifier is turned on during the 400 microseconds portion of the wave form in FIG. 11. Thus, the voltage at the collector of transistor 116 is positive with respect to −15 volt bus 118. Thus, the emitter base junction of transistor 120 is backward biased, thereby cutting it off. Thus, the output from the operation amplifier is fed back to the input thereof while transistor 120 is off for the 400 microsecond period. After the 400 microseconds period has elapsed, the voltage at terminal 112 returns to a positive 10 volts as shown in FIG. 11, thus turning transistor 116 off and transistor 120 on. This effectively grounds terminal 112, as shown in FIG. 12.

It is important that, during the on time of transistor 120, terminal 112 be brought as close as possible to ground, once again, to insure an accurate division computation. This is accomplished by the inverted transistor 120, the operation of which has been already described in relation to transistors 84 and 86. Further, diode 124 functions in a manner similar to that described for diodes 94 and 96.

The time modulated wave form developed at terminal 122 is averaged out by a feedback condenser 224, which serves the dual purposes of averaging, as stated, and also zeroing the operational amplifier input. Condenser 126 is employed for eliminating parasitic oscillations. Thus, the output from amplifier 28 is indeed the quotient of the division of the signal occurring at the terminal 127 by the signal occurring at terminal 128.

The gauge 12 measures the instantaneous value of the signal being measured and this is being connected to potentiometer 130 via switch contacts 16 also shown in FIG. 1. The purpose of potentiometer 130 is to attenuate the voltage $E_1$ so that a desired constant will multiply the output quotient as described hereinbefore.

The signal from the wiper of potentiometer 130 is applied to integrator 14 which comprises a conventional operational amplifier integrating circuit. The output from integrator 14 is applied to potentiometer 132. Thus, the signal representative of the integral of the measured parameter with respect to time is developed at the wiper of potentiometer 132 and applied to resistor 30.

As is stated hereinbefore, there are various features of the multiplier 34 of FIG. 3 which cause the duty cycle of the time modulated signal appearing at terminal 122 of FIG. 4 to be of high accuracy. First, it should be noted that the duty cycle is equal to the 400 microseconds on time of single shot circuit 40 divided by the variable cycle time determined by ramp generator 36, see FIGS. 9—12. To compensate for variations due to temperature and aging conditions, the capacitors 52 and 106 are approximately equal. Hence, any changes in these capacitors due to the above conditions will generally effect both in the same way. Since the on time of single shot 40 is basically determined by condenser 106 and the cycle time of ramp generator 36 by capacitor 52, it follows that any tendency for the duty cycle to vary because of temperature, etc., will be compensated by the selection of equal values for the capacitors 52 and 106.

A further source of possible inaccuracy of the duty cycle arises because of the finite discharge time of capacitor 52. Reference should be made to FIG. 13 which is a graph illustrating various relationships between the duty cycle, D, and the input voltage $E_2$ at terminals 128. Line 133 represents the desired relationship between the duty cycle and the input voltage. For small values of $E_2$, the duty cycle is small, since the cycle time is large, this, of course, following from the fact that the cycle time is large when the voltage $E_2$ is small as stated hereinbefore. When the input voltage $E_2$ is large, the duty cycle is also large.

However, the actual state of affairs tends to be that shown by curve 134. This curve illustrates the effect on line 133 because of the finite discharge time of capacitor 52, which is 5 microseconds in the example given for FIG. 4. The range of rise times for ramp generator 36 is typically 500 microseconds to 2000 microseconds. Assume $E_2$ is small enough to cause a 2000 microsecond rise time. The addition of the 5 microsecond discharge time to the 2000 microsecond rise time gives the cycle time as shown in FIG. 9. However, the addition of 5 microseconds to 2000 microseconds has little effect on the overall cycle time; and, therefore, the curve 134 closely approximates line 133 for low values of $E_2$. Next, assume that $E_2$ has a large enough value to cause a 500 microsecond ramp rise time. The addition of the 5 microseconds discharge time to the 500 microseconds effects the total cycle time more significantly than for low values of $E_2$. Hence, the large deviation of curve 134 from line 133 for large values of $E_2$.

To compensate for this undesirable effect, resistor 54 is connected and parallel to capacitor 52, the product of resistor 54 and capacitor 52 typically being approximately 100 times greater than the product of resistor 48 and capacitor 52. The overall effect of adding resistor 54 into the timing circuit of generator 36 is to increase the rise time, especially for low voltages. Hence, the line 136 results as shown in FIG. 13. This follows because an error is effectively introduced into the cycle for low values of $E_2$, this error being larger than the error introduced for large values of $E_2$. Hence, the line 136 is in error with respect to line 133 by a constant proportionality factor for all values of $E_2$. In other words, the error has been linearized for all values of $E_2$. Hence, it is now a simple matter to increase the setting of the wiper of linear potentiometer 46 to compensate for this linear error. By so doing, the line 136 is moved to approximately the same location as line 133.

The timing resistors for the ramp circuit 36 and the single shot 40 circuit are also so chosen as to have low drift with temperature, thereby introducing further compensation of such factors as temperature on the duty cycle.

Because of all the above features incorporated in the divider circuit voltage offsets from ground in $E_0$ of 0.001 volt are attainable. Further division accuracy to better than 1 percent has been attained.

Having now described the overall system for obtaining the running average of a slowly varying measured parameter, together with improved circuitry for dividing and multiplying two slowly varying analogue signals, circuitry will now be described for changing the two quadrant operation of the multiplier shown in FIG. 3 to four quadrant operation. It is to be noted that the divider unit shown in FIGS. 2 and 4 necessarily constrains the divisor $E_2$ to be greater than or less than zero since division by zero is, of course, impossible and, therefore, the polarity of the divisor must not be permitted to change from positive to negative values, since to do so would mean to cross the zero value. However, there are many applications where multiplication of two input signals, the polarity of both of which can vary from positive and negative values, is desired. As has already been pointed out, the time division approach of the multiplier described in relation to FIG. 4 has a high inherent accuracy because of various features which have already been described in detail. However, the multiplier of FIG. 4 is restricted to a two quadrant operation. Thus, the circuits of FIGS. 5 and 7 are necessary to convert the multiplier shown in FIGS. 3 and 4 to a four quadrant operation whenever a situation so requires.

Referring to FIGS. 5 and 6, there is shown circuitry for converting the multiplier 34 of FIG. 3 to four quadrant multiplier 138 and a graph illustrating typical input values acceptable to the multiplier. For purposes of illustration, it is assumed that the multiplier 34 shown in FIG. 5 will accept positive and negative values of $E_1$, below 10 volts, but only negative values of $E_2$ between $-10$ and $-2$ volts. A summer 140 has the input $E_3$ connected thereto over line 142 and a 6 volt bus 144 connected to another input thereto. A phase reversal is introduced by summer 140 and therefore the output therefrom is the negative of the sum of the input voltages applied thereto. The output from multiplier 34 is applied over line 146 to summer 148, while the input voltage $E_1$ is connected to an attenuator 150 over line 152. The output of attenuator 150 is connected to another input of summer 148 over line 154. The summer 148 typically comprises a pair of input resistors connected to the input of an operational amplifier which has a parallel resistor-capacitor smoothing circuit in the feedback path thereof (not shown). Because of the smoothing circuit, the time modulated wave form at the output of multiplier 34 is smoothed and, therefore, the output voltage from the multiplier 138 is also smooth.

Having described the structure of the four quadrant multiplier of FIG. 5, the operation thereof will now be described. Because of the polarity inversion of summer 140, the output from this summer is $-E_3 -6$ volts. When this signal is multiplied by $E_1$ by multiplier 34, the output signal therefrom is $-0.1E_{13}-0.6E_1$, the output from multiplier 34 being attenuated by a factor 0.1. The attenuation circuit is not shown. If the attenuator 150 is set so that the output signal therefrom is $0.6E_1$, the output from summer 148 is $0.1E_1 E_3$, which is the desired result, the factor of 0.1 being removable if so desired. Since multiplier 34 can accept only voltages between the ranges of $-10$ and $-2$ volts, and since bus 144 is at 6 volts, it necessarily follows that the permissible range of variation of $E_3$ is between $\pm 4$ volts as shown in FIG. 6. Of course, the ranges of $E_1$ and $E_3$ can be adjusted by varying the acceptable input voltages to multiplier 34 and the voltage at 144.

Referring now to FIG. 7, there is shown a further modification of the multiplier 34 of FIG. 3. The region of operation of this multiplier circuit is shown in FIG. 8. It is assumed that the permissible range of variation of multiplier 34 is the same as that assumed for FIG. 5 —that is, it will accept positive and negative values of $E_1$ below 10 volts, but only negative values of $E_2$ between $-10$ and $-2$ volts. However, note that the modified multiplier 156 of FIG. 7 will accept a large range of $E_3$ values. However, it will not work well at values of $E_3$ near zero as will be explained hereinafter. $E_1$ is applied to the multiplier 34 directly. The output of multiplier 34 is fed to a smoothing circuit 158, which comprises operational amplifier 160, together with resistor 162 and condenser 164 in the feedback path thereof. The purpose of circuit 158 is to smooth the time modulated output signal from multiplier 34 and to isolate the output of multiplier 34. Circuit 158 also inverts the polarity of the output signal from multiplier 34 and applies it to one of the input terminals of summer 166 over line 168. The output of circuit 158 is also connected to an inverted transistor 170 through isolating resistor 171 and to inverted transistor 172 through isolating resistor 174. Further, the output of circuit 158 is connected to another input of summer 166 through unity-gain, polarity inverting, operational amplifier 176.

The multiplier 156 input signal $E_3$ is applied to an absolute value circuit 178 which comprises a unity gain, polarity inverting, operational amplifier 180, and diodes 182 and 184 respectively connected in series and parallel thereto. The purpose of circuit 178 is to obtain the negative of the absolute value of the voltage $E_3$. This voltage is applied over line 186 to multiplier 34. Thus, the output from multiplier 34 is as shown in FIG. 7.

The voltage $E_3$ is also applied to a high gain saturating amplifier 188, which does not invert the polarity of the input signal $E_3$. The output voltage from this amplifier typically has a relatively high value of $\pm 15$ volts, depending on the polarity of input voltage $E_3$. The output of amplifier 188 is applied to the base of transistor 170 over line 190 and to the base of transistor 172 through polarity inverter 192 over line 194.

Having now described the structure of the modified multiplier circuit 156 of FIG. 7, the operation thereof will now be described. The output voltage from multiplier 34 is $-E_1$ times the absolute value of $E_3$, this voltage being inverted by circuit 158 to provide the output voltage shown in FIG. 7. Depending on the signs of $E_1$ and $E_3$, the positive or negative value of the output voltage from circuit 158 is applied to one of the inputs of summer 166 by transistors 170 and 172. For instance, if the value of $E_1$ is positive and the value of $E_3$ is negative, the output from multiplier 34 would be negative and from circuit 158 would be positive. However, it is required that the output from summer 166 be negative; therefore, it is necessary that the output from circuit 158 be inverted by inverter 176 before summer 166 operates.

In order to bring out this required action, the negative voltage $E_3$ is applied to saturating amplifier 188, typically a 15 volt signal being applied from the output thereof. Since switching transistors 170 and 172 require a negative voltage to turn on, transistor 170 will be turned on while transistor 172 will not, since the output from amplifier 188 is inverted by inverter 192 before application to the base of transistor 172. Thus, it can now be seen that the path 168 from circuit 158 is shorted to ground, while the path through isolating resistor 174 remains available for transmission of the output signal 158 to the summer 166. Of course, this signal will be inverted by inverter 176, thereby meeting the requirements stated above for proper operation of the multiplier 156 when $E_1$ is positive and $E_3$ is negative.

By choosing other combinations of the polarity of voltages $E_1$ and $E_3$, it can be shown that the multiplier 156 does indeed bring about the desired four quadrant operation shown at FIG. 8. The performance of the circuit near zero voltages of $E_3$ is not satisfactory because of the performance of the diodes 182 and 184 at these voltages. However, as stated before, the range of usable values of $E_3$ for a given range of values on $E_2$ of multiplier 34 has been significantly extended with respect to the range obtained by the circuit illustrated in FIG. 5.

Thus, there has now been described an improved apparatus for calculating the running average of a parameter such as the thickness of a sheet of material. Also, improved means for dividing and multiplying slowly varying analogue signals have been described. It would, of course, be obvious to one having ordinary skill in this art to take advantage of the complementary nature of transistors and replace NPN transistors by PNP types, if this were considered desirable.

Still numerous other modifications of the invention will become apparent to one of ordinary skill in the art upon reading the foregoing disclosure. During such a reading, it will be evident that this invention has provided a unique method and equipment for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

We claim:

1. A system for measuring the average value of a parameter which varies with time, the system comprising:

means for transducing the parameter to an electrical signal, means for integrating the transduced electrical signal with respect to time from a given instant of time, means for generating an electrical signal representative of the time elapsed from said instant of time, and means for dividing the integrated signal by the elapsed time signal to generate a signal representative of the said average of said parameter, said divider circuit including an operational amplifier, a summing network for applying an input signal to the input terminal of said amplifier, said integrated signal being applied to one input of said summing network, time division multiplier means responsive to said elapsed time signal and the output signal from said operational amplifier for applying a time-modulated input signal to said summing network, said time modulation being proportional to a characteristic of said elapsed time signal, said multiplier comprising;

means responsive to said elapsed time signal for generating a further signal whose amplitude changes monotonically with time, the amount of time required for said amplitude to change from a first predetermined value to a second predetermined value being a function of said characteristic of said elapsed time signal, said further signal generating means including capacitive and resistive means for controlling the amount of time said amplitude changes from said first predetermined value to said second predetermined value, means for generating a pulse signal of constant width in response to said further signal attaining said second predetermined value;

gating means for generating said time-modulated input signal in response to said constant pulse width signal and said operational amplifier input signal;

the cycle time or period of said time-modulated input signal being a function of the time required for said further signal characteristic to change from said first predetermined value to said second predetermined value; and the duty cycle of said time-modulated input signal being a function of said cycle time and the width of said constant width signal.

2. A measuring system as in claim 1 wherein said elapsed time signal generating means comprises means for generating a signal having an amplitude representative of said elapsed time.

3. A measuring system as in claim 1 where said multiplier means includes means for resetting said means for generating said further signal to said first predetermined amplitude in response to said further signal attaining said second predetermined amplitude, said resetting means including at least two transistors operated in the inverted mode for discharging said capacitive means to said first predetermined voltage.

4. A measuring system as in claim 3 where said resetting means includes means for generating a pair of signal pulses having opposite polarity in response to said further signal attaining said second predetermined amplitude, and where said two inverted transistors are of opposite conductivity type, said transistors being connected to opposite ends of said capacitive means and respectively responsive to said signal pulses to discharge said capacitive means to said first predetermined voltage.

5. A measuring system as in claim 1 where said means for generating said constant width pulse signal includes capacitive means for controlling said constant width, said capacitive means of said further signal generating means and said capacitive means of said constant pulse width signal generating means being substantially equal in value, thereby reducing variations of said duty cycle with respect to such factors as temperature or time.

6. A measuring system as in claim 1 where the cycle time of said time-modulated signal is determined by the sum of (1) the time said further signal amplitude changes from said first predetermined value to said second predetermined value and (2) the time required for resetting said further signal to said first predetermined value after it attains said second predetermined value and where the time required for said further signal to change from said first value to said second value is inversely proportional to the said characteristic of the elapsed time signal, said resistive means including means for increasing the amount of time required for said further signal to increase from said first value to said second value for small values of the characteristic of the elapsed time signal with respect to larger values thereof thereby causing the duty cycle of said time-modulated signal to vary by a constant factor of proportionality from a predetermined, desired relationship between the duty cycle and the characteristic of the said elapsed time signal, and means for adjusting the value of the characteristic of said elapsed time signal so that said proportionality factor is changed to substantially one.

7. A measuring system as in claim 6 where said means for increasing the amount of time said further signal increases from said first value to said second value includes a further resistor connected in parallel circuit with the capacitor of the resistor-capacitor combination that basically determines the time for said further signal to change from said first value to said second value, the product of said further resistor and said capacitor being approximately 100 times greater than the product of said resistor-capacitor combination.

8. A system for measuring the average value of a parameter which varies with time, including means for transducing said parameter to an electrical signal, means for integrating the transduced electrical signal with respect to time from a given instant of time to produce in integrated signal, means for generating an electrical signal representative of the time elapsed from said instant of time, and a divider circuit comprising:
an operational amplifier for producing an output signal, said amplifier having a summing network at the input thereof, said integrated signal being applied to one input of said summing network,
means responsive to said elapsed time signal for generating a further signal which repetitively changes from a first predetermined value to a second predetermined value during a time period determined by said elapsed time signal,
means for generating a pulse signal of constant width in response to said further signal's attaining said second predetermined value.
means for means for resetting said means for generating said further signal so as to return said further signal to said first predetermined value in response to said further signal's attaining said second predetermined value,
means for producing a signal which is responsive to said amplifier output signal and which is time-modulated in accordance with said constant width pulse signal and said time period, and
means coupling said time-modulated signal to another input of said summing network at said input of said summing amplifier to cause said amplifier output signal to be representative of said average value of said parameter.

9. A measuring system as in claim 8 where said operational amplifier includes means responsive to said operational amplifier output signal for averaging said operational amplifier output signal and grounding said amplifier input terminal.

10. A system as in claim 8 wherein said further signal changes in amplitude and the means for generating said further signal includes capacitive and resistive means for controlling the amount of time said amplitude changes from said first predetermined value to said second predetermined value.

11. A system as in claim 10 including means for resetting said further signal to said first predetermined amplitude in response to said further signal attaining said second predetermined amplitude, said resetting means including at least two transistors operated in the inverted mode for discharging said capacitive means to said first predetermined voltage.

12. A system as in claim 11 wherein said resetting means includes means for generating a pair of signal pulses having opposite polarity in response to said further signal attaining said second predetermined amplitude, and where said two inverted transistors are of opposite conductivity type, said transistors being connected to opposite ends of said capacitive means and respectively responsive to said signal pulses to discharge said capacitive means substantially to said first predetermined voltage.

13. A measuring system as in claim 10 wherein said means for generating said constant width pulse signal includes capacitive means for controlling said constant width, said capacitive means of said further signal generating means and said capacitive means of said constant pulse width signal generating means being substantially equal in value thereby reducing variations of said duty cycle with respect to such factors as temperature or time.

14. A measuring system as in claim 10 wherein the cycle time of said time-modulated signal is determined by the sum of (1) the time said further signal amplitude changes from said first predetermined value to said second predetermined value and (2) the time required for resetting said further signal to said first predetermined value after it attains said second predetermined value and where the time required for said further signal to change from said first value to said second value is inversely proportional to the said characteristic of said second signal, said resistive means including means for increasing the amount of time required for said further signal to increase from said first value to said second value for small values of the characteristic of the second signal with respect to larger values thereof thereby causing the duty cycle of said time-modulated signal to vary by a constant factor of proportionality from a predetermined, desired relationship between the duty cycle and the characteristic of the said second signal, and means for adjusting the value of the characteristic of said second signal so that said proportionality factor is changed to substantially one.

15. A measuring system as in claim 14 wherein said means for increasing the amount of time said further signal increases from said first value to said second value includes a further resistor connected in parallel circuit with the capacitor of the resistor-capacitor combination that basically determines the time for said further signal to change from said first value to said second value, the product of said further resistor and said capacitor being approximately 100 times greater than the product of said resistor-capacitor combination.

16. A multiplier as in claim 8 where the amplitude of said time-modulated signal is a function of the amplitude of said first signal.

17. A system as in claim 8 including means for substantially reducing to zero said time-modulated signal coupled to said another input of said summing network in the absence of said constant width pulse.